(12) United States Patent
Laakso

(10) Patent No.: US 8,056,664 B2
(45) Date of Patent: Nov. 15, 2011

(54) INTAKE COVER

(75) Inventor: Brandy Kay Laakso, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 12/261,226

(22) Filed: Oct. 30, 2008

(65) Prior Publication Data

US 2010/0038161 A1   Feb. 18, 2010

Related U.S. Application Data

(60) Provisional application No. 61/088,297, filed on Aug. 12, 2008.

(51) Int. Cl.
*B60K 13/02* (2006.01)

(52) U.S. Cl. ............ 180/68.3; 180/68.1; 296/193.09

(58) Field of Classification Search ......... 180/68.1, 180/68.2, 68.3, 68.4, 68.6; 296/193.09, 193.1, 296/280; 123/198 E
See application file for complete search history.

(56) References Cited

U.S. PATENT DOCUMENTS

| | | | |
|---|---|---|---|
| 4,212,659 A | 7/1980 | Magrini | |
| 4,420,057 A | 12/1983 | Omote et al. | |
| 5,251,712 A * | 10/1993 | Hayashi et al. | 180/68.3 |
| 5,269,264 A | 12/1993 | Weinhold | |
| 6,035,955 A | 3/2000 | Suzuki et al. | |
| 6,880,655 B2 | 4/2005 | Suwa et al. | |
| 6,991,531 B2 | 1/2006 | Wijaya et al. | |
| 7,237,635 B2 * | 7/2007 | Khouw et al. | 180/68.3 |
| 7,523,798 B2 * | 4/2009 | Muramatsu et al. | 180/68.1 |
| 7,717,204 B2 * | 5/2010 | Kondou et al. | 180/68.1 |

\* cited by examiner

*Primary Examiner* — John Walters
(74) *Attorney, Agent, or Firm* — Plumsea Law Group, LLC

(57) ABSTRACT

A system to prevent hot air from entering an intake cover is disclosed. The system includes overlapping extended portions disposed on the intake cover and a battery cover. The extended portions are configured to prevent hot air from entering the intake cover and allow water to drain from the intake cover.

24 Claims, 7 Drawing Sheets

INTAKE COVER

CROSS-REFERENCE TO RELATED APPLICATION

This application claims priority under 35 U.S.C. §119(e) to U.S. Provisional Patent Application No. 61/088,297, entitled "Intake Cover", and filed on Aug. 12, 2008, which application is hereby incorporated by reference.

BACKGROUND

The present invention relates to motor vehicles and in particular to a cover for an intake system.

Methods for preventing water from entering an intake system have been previously proposed. Magrini (U.S. Pat. No. 4,212,659) teaches an air intake device for a combustion engine. Magrini teaches a hollow casing having a downward facing intake aperture in which a series of baffle plates, by means of curved downstream end portions, deflect the induced air away from the inlet causing water droplets to collect on the casing roof and fall by gravity into annular water traps which have water discharge openings.

There is a need in the art for a device that prevents water from entering an intake system and also helps reduce hot air from entering the intake system.

SUMMARY

An intake cover is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: an intake cover configured to deliver air to an intake system; an engine bay component including a forward portion disposed adjacent to a rearward portion of the intake cover; the forward portion being spaced apart from the rearward portion in a generally longitudinal direction, wherein the longitudinal direction generally extends in a direction between a front of the motor vehicle and a rear of the motor vehicle; the forward portion including a first extended portion that extends in the longitudinal direction towards the rearward portion, the intake cover including a second extended portion that extends in the longitudinal direction towards the forward portion; and where the first extended portion overlaps with the second extended portion in the longitudinal direction and thereby substantially reduces hot air flow between the forward portion and the rearward portion.

In another aspect, the forward portion and the rearward portion are spaced apart by a gap.

In another aspect, the intake cover includes an interior portion.

In another aspect, the rearward portion of the intake cover includes a first opening that is configured to allow water to flow from the interior portion to the gap.

In another aspect, the rearward portion of the intake cover includes a second opening that is configured to allow water to flow from the interior portion to the gap.

In another aspect, the first opening is disposed above the second opening.

In another aspect, water can pass over the first extended portion and the second extended portion and thereby drain from the gap.

In another aspect, the first extended portion is disposed above the second extended portion.

In another aspect, the second extended portion is disposed above the first extended portion.

In another aspect, the invention provides a motor vehicle, comprising: an intake cover configured to deliver air to an intake system; an engine bay component including a forward portion disposed adjacent to a rearward portion of the intake cover; the forward portion and the rearward portion being separated by a gap; a bottom portion of the gap disposed adjacent to a radiator; and wherein a matrix structure is disposed in the bottom portion and thereby substantially prevents hot air from the radiator from flowing through the bottom portion.

In another aspect, the matrix structure includes at least one extended portion.

In another aspect, the matrix structure includes two or more extended portions.

In another aspect, the matrix structure includes a first extended portion and a second extended portion.

In another aspect, the first extended portion extends from a rearward portion of the intake cover.

In another aspect, the second extended portion extends from a forward portion of the engine bay component.

In another aspect, the first extended portion extends in a generally perpendicular manner from the rearward portion.

In another aspect, the second extended portion extends in a generally perpendicular manner from the forward portion.

In another aspect, the first extended portion and the second extended portion are configured to overlap in a direction extending between the forward portion and the rearward portion.

In another aspect, the first extended portion is spaced apart from the second extended portion in a generally vertical direction that is perpendicular to the longitudinal direction.

In another aspect, water can drain through the matrix structure.

In another aspect, the invention provides a system for preventing hot air from entering an intake system in a motor vehicle, the system comprising: an intake cover configured to deliver air to the intake system; an engine bay component disposed proximate to the intake cover, wherein a gap is disposed between the engine bay component and the intake cover; and wherein at least one extended portion extends from one of the intake cover and the engine bay component, the at least one extended portion including a free end portion that is disposed in the gap.

In another aspect, engine bay component is a battery cover.

In another aspect, the at least one extended portion includes a first extended portion that extends from the intake cover.

In another aspect, the at least one extended portion includes a second extended portion that extends from the engine bay component.

In another aspect, the invention provides a system for preventing hot air from entering an intake system in a motor vehicle, the system comprising: an intake cover configured to deliver air to the intake system; an engine bay component disposed proximate to the intake cover; and where at least one of the intake cover and the engine bay component includes provisions to prevent hot air from entering the intake system.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
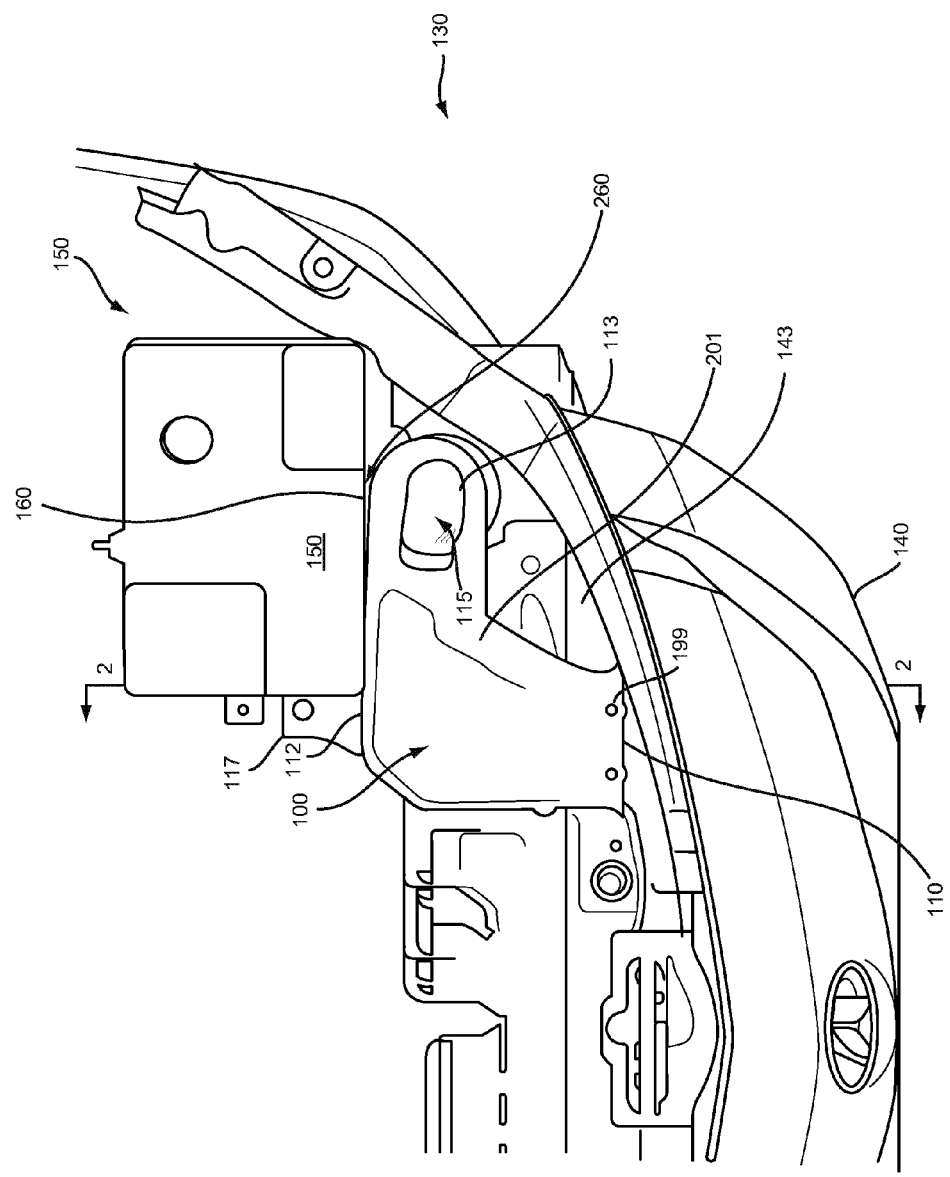
FIG. 1 is a top down view of an exemplary embodiment of an intake cover disposed within a portion of a motor vehicle.
Figure 2:
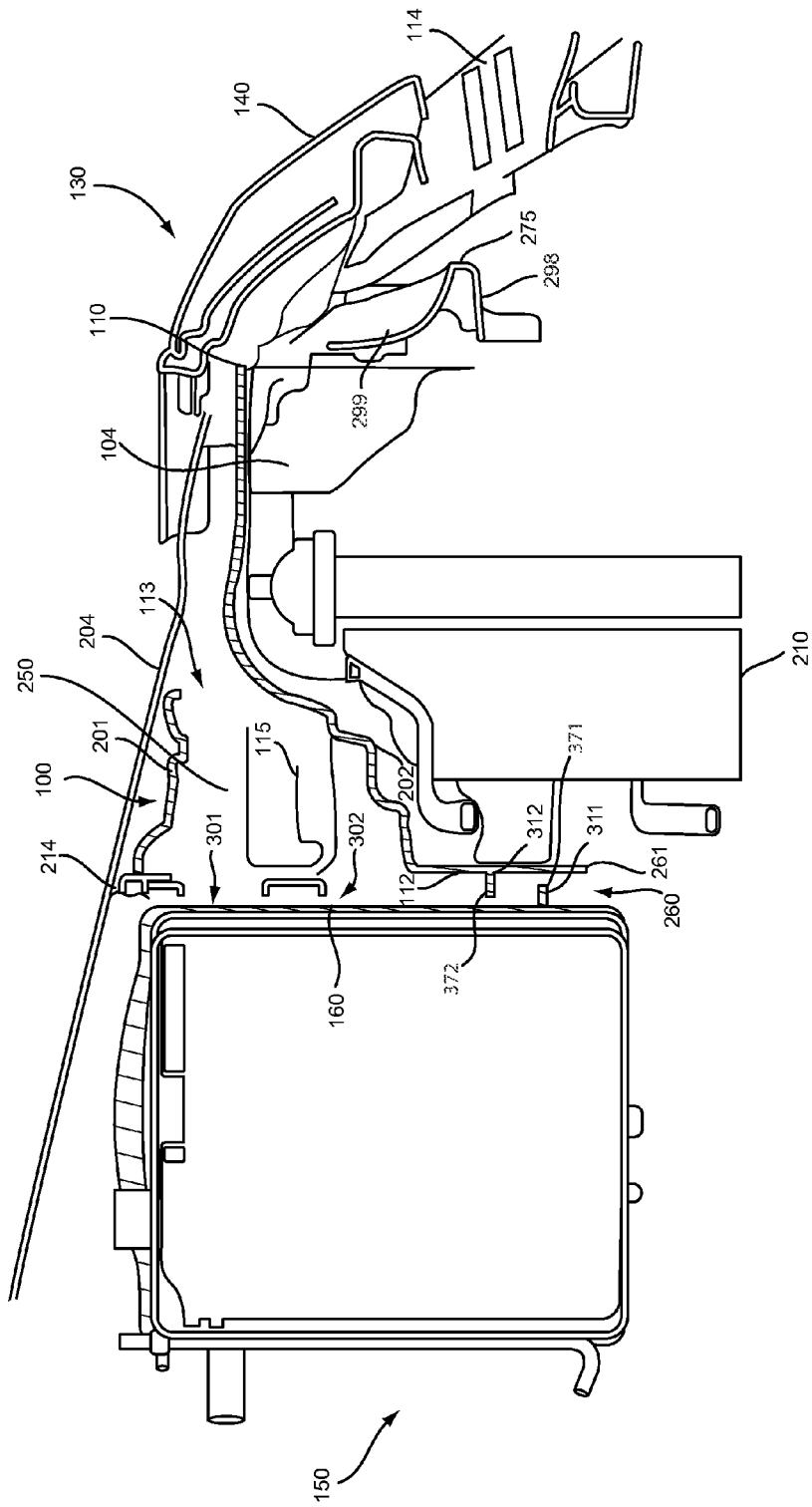
FIG. 2 is a side cross sectional view of an exemplary embodiment of an intake cover disposed within a portion of a motor vehicle.

FIG. 1 is a top down view of an exemplary embodiment of intake cover 100 disposed within a portion of motor vehicle 130. FIG. 2 is a side cross sectional view of an exemplary embodiment of intake cover 100 disposed within a portion of motor vehicle 130. Intake cover 100 may be associated with an engine of motor vehicle 130. For purposes of clarity, the engine of motor vehicle 130 is not illustrated in these embodiments. Generally, motor vehicle 130 can be any type of motor vehicle, including, but not limited to cars, trucks, vans, minivans, SUV's, motorcycles, scooters, boats, personal watercraft and aircraft.

An intake cover may be used to deliver air into an intake system. The term "intake system" as used throughout this detailed description and in the claims refers to various components that can be used for directing air into an engine. An intake system can include an intake manifold, as well as tubes or other provisions for directing air into an engine. In some embodiments, the intake cover may help prevent water from entering an intake system by covering an intake port of the intake system. For example, an intake cover can be used to help prevent rain water from entering an intake system. Furthermore, an intake cover may also help prevent hot air from an engine bay from entering the intake system.

In this exemplary embodiment, intake cover 100 is configured to deliver air to an engine. In particular, intake cover 100 is configured to deliver air to an intake system of the engine. In some embodiments, intake cover 100 may include an exit port that is in fluid communication with an intake port of the intake system. In this exemplary embodiment, intake cover 100 may include exit port 115 that is disposed within intake cover 100. With this arrangement, air entering intake cover 100 may be delivered to the intake system via exit port 115.

Generally, intake cover 100 can be configured with any size and shape to provide air to an intake system. In some embodiments, intake cover 100 can be configured with a regular geometric shape such as a rectangular shape. In other embodiments, intake cover 100 can be configured with an irregular geometric shape. In this exemplary embodiment, intake cover 100 has a generally L-like shape.

Referring to FIG. 1, intake cover 100 includes forward portion 110 and rearward portion 112. Forward portion 110 may extend in a substantially longitudinal direction. The term "longitudinal direction" as used throughout the specification and claims refers to a direction between a front of a motor vehicle and a rear of a motor vehicle. Also, rearward portion 112 may extend in a substantially lateral direction. The term "lateral direction" as used throughout the specification and claims refers to a direction that is generally perpendicular to the longitudinal direction. In some cases, the lateral direction may run between the sides of a motor vehicle.

Intake cover 100 may be configured with a shape that conforms to a portion of bulkhead 104 of the engine, as illustrated in FIG. 2. In particular, upper portion 201 of intake cover 100 generally conforms to bulkhead cover 204. Also, lower portion 202 of intake cover 100 conforms to a portion of radiator 210. Generally, lower portion 202 can be configured with any shape that conforms to components of motor vehicle 130. In this embodiment, lower portion 202 is configured with a generally convex shape that conforms to radiator 210 as well as other components not illustrated in this Figure for purposes of clarity.

Intake cover 100 may include provisions for fastening to motor vehicle 130. Referring to FIG. 1, intake cover 100 includes fastening portion 117 disposed adjacent to rearward portion 112. Fastening portion 117 may be fastened to any portion of motor vehicle 130 in order to secure intake cover 100 in place with respect to an intake system. In some cases, fastening portion 117 may be fastened to a battery cover. In other cases, fastening portion 117 may be fastened to another component of motor vehicle 130. Intake cover 100 may also include provisions for fastening to body portion 143 of motor vehicle 130. In this embodiment, forward portion 110 of intake cover 100 may be fastened to body portion 143 using fastening clips 199. In some embodiments, intake cover 100 may include additional provisions to fasten to an engine or other components of motor vehicle 130 not illustrated in this Figure for purposes of clarity.

Generally, intake cover 100 may be disposed in any location in motor vehicle 130 with access to ambient air. In this exemplary embodiment, intake cover 100 is disposed proximate to front portion 140 of motor vehicle 130. In particular, forward portion 110 is disposed proximate to front portion 140. With this arrangement, forward portion 110 of intake cover 100 may receive air from front portion 140 of motor vehicle 130.

In some embodiments, rearward portion 112 may be disposed proximate to battery cover 150. In particular, rearward portion 112 is spaced apart from forward portion 160 of battery cover 150 in a generally longitudinal direction. This configuration creates gap 260 disposed between forward portion 160 and rearward portion 112.

In some embodiments, rearward portion 112 may extend only a portion of the height of forward portion 160. In other embodiments, rearward portion 112 can extend further than the height of forward portion 160. In an exemplary embodiment, rearward portion 112 extends substantially the entire height of forward portion 160 as illustrated in FIG. 2.

Generally, intake cover 100 may include any provisions for receiving air. In this exemplary embodiment, upper portion 201 includes opening 113 disposed proximate to forward portion 110. In particular, opening 113 is oriented toward front portion 140 of motor vehicle 130. With this arrangement, air flowing through grill 114 of front portion 140 can enter intake cover 100 through opening 113.

Referring to FIG. 2, air entering opening 113 may travel through interior portion 250 of intake cover 100 before exiting intake cover 100. Generally, intake cover 100 may be configured in any manner to allow air to exit intake cover 100. As previously discussed, intake cover 100 may include exit port 115. With this configuration, air within intake cover 100 can enter an intake system through exit port 115.

An intake cover may be configured to supply cool air to an intake system. However, hot air from the engine may also enter the intake cover. In addition, water may enter the intake cover. Typically, the intake cover can include various provisions to reduce or eliminate the amount of hot air and water entering the intake cover.

In some embodiments, an intake cover may be sealed to a portion of an engine to block some of the hot air generated by the engine from entering the intake cover. Generally, any portion of intake cover 100 can be sealed to bulkhead cover 204 to prevent hot air from the engine from entering intake cover 100. In this embodiment, upper portion 201 of intake cover 100 is sealed to bulkhead cover 204, as illustrated in FIG. 2. In particular, upper portion 201 is sealed to bulkhead cover 204 with rubber seal 214. With this arrangement, rubber seal 214 can prevent some of the hot air generated by the engine from entering intake cover 100.

A motor vehicle may include provisions for reducing water from entering an opening of an intake cover. In some embodiments, an air guide mount can be disposed proximate to an opening of the intake cover to reduce the amount of water entering the opening. In this exemplary embodiment, opening 113 of intake cover 100 is disposed proximate to air guide mount 275. Air guide mount 275 may further comprise upper portion 299 and lower portion 298. In some cases, lower portion 298 of air guide mount 275 is configured to block water traveling upward along radiator 210 from entering opening 113. Likewise, in some cases, upper portion 299 can also be configured to block water traveling upward along radiator 210 from entering opening 113. For example, in embodiments that do not include a lower portion for air guide mount 275, a lower surface of upper portion 299 can help prevent water from entering opening 113. Furthermore, an upper surface of upper portion 299 of air guide mount 275 may be configured to direct air from grill 114 into opening 113. Using this configuration, air guide mount 275 can direct air into opening 113 while blocking water from entering opening 113.

An intake cover may be configured with openings to allow water that enters the intake cover to escape so that the water does not enter components of an intake system. In some embodiments, an intake cover can be configured with openings that allow water to escape through the intake cover. Generally, any portion of intake cover 100 can be configured with openings. In some cases, rearward portion 112 can include openings configured to allow water to flow from interior portion 250 of intake cover 100 to gap 260. With this arrangement, water may flow from interior portion 250 through openings within rearward portion 112 to gap 260.

Figure 3:
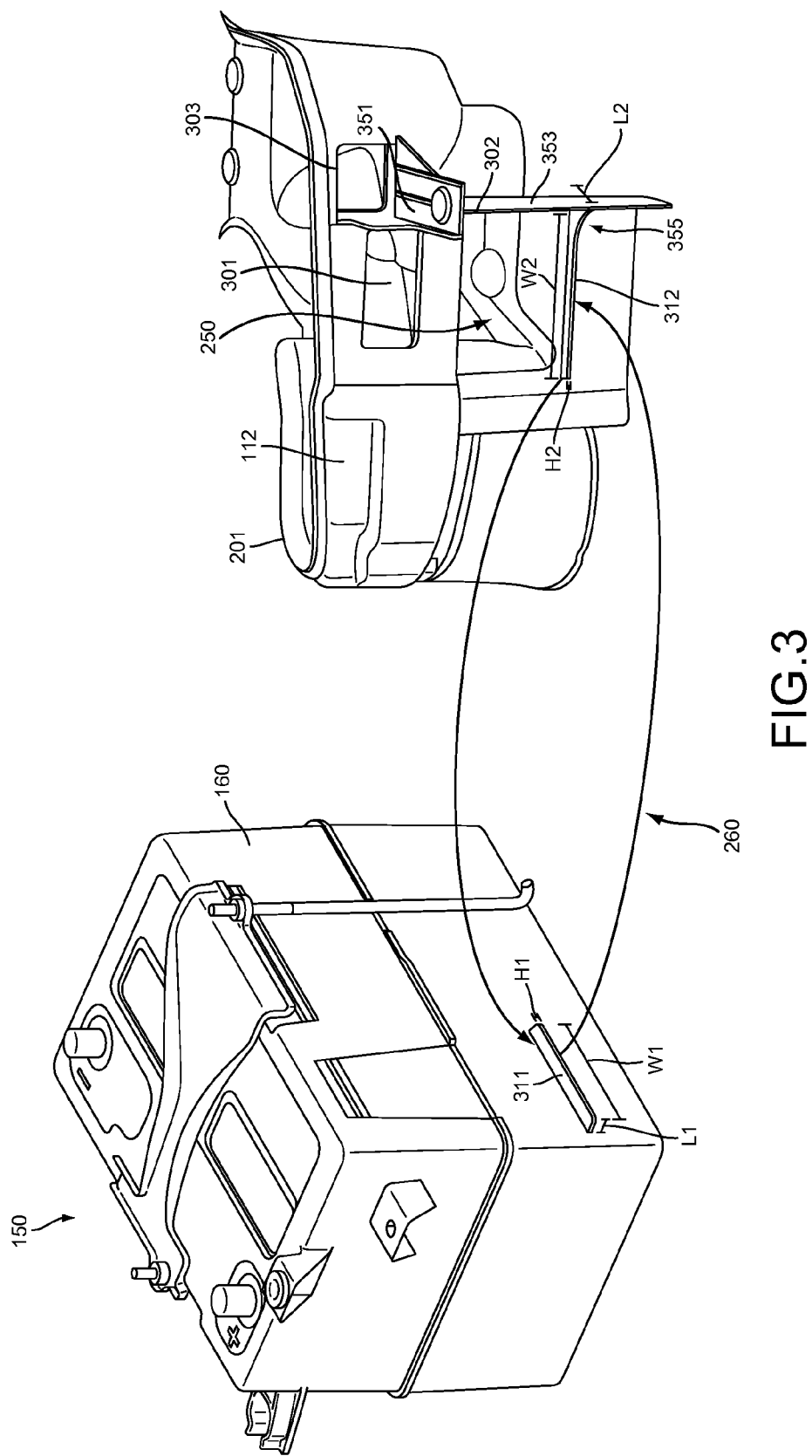
FIG. 3 is an exploded isometric view of an exemplary embodiment of an intake cover and a battery cover.

FIG. 3 illustrates an exploded isometric view of an exemplary embodiment of rearward portion 112 of intake cover 100 and battery cover 150. In this embodiment, rearward portion 112 includes three openings to allow water to escape. In particular, rearward portion 112 includes first opening 301, second opening 302, and third opening 303. In other embodiments, rearward portion 112 can include more or less openings to facilitate the removal of water from intake cover 100.

Openings can have any shape, including, but not limited to, square shapes, rectangular shapes, circular shapes, rounded shapes, regular shapes, irregular shapes, as well as any other type of shapes. In this embodiment, first opening 301 may have a generally rectangular shape. Second opening 302 may have a generally boot-like shape. Finally, third opening 303 may have a generally square shape.

Generally, openings can be configured in any arrangement on rearward portion 112 to facilitate the exit of water from intake cover 100. In this embodiment, first opening 301 is disposed above second opening 302. Likewise, third opening 303 is disposed above and to a side of first opening 301. Using this arrangement, water may flow through first opening 301 and third opening 303 to exit interior portion 250. In addition, water may drain from interior 250 through second opening 302. Once the water has exited through first opening 301, second opening 302 and third opening 303, the water may be configured to drain through gap 260.

In some cases, a gap disposed adjacent an intake cover may allow hot air from an engine to enter the intake cover. In particular, hot air may enter the gap if a portion of the gap is disposed adjacent to a heat generating component of an engine, such as a radiator or a fan. A gap may be disposed adjacent to an intake cover is configured with provisions to substantially reduce airflow into the gap, especially hot air flow.

As previously discussed, forward portion 160 of battery cover 150 and rearward portion 112 of intake cover 100 form gap 260, as illustrated in FIG. 2. In addition, bottom portion 261 of gap 260 is disposed adjacent to radiator 210. In some cases, hot air from radiator 210 may travel up through bottom portion 261 of gap 260 to enter intake cover 100 through first opening 301, second opening 302 and/or third opening 303 (see FIG. 3).

In order to substantially reduce airflow into bottom portion 261, bottom portion 261 can be configured with a matrix structure. Generally, a matrix structure can comprise one or more extended portions that extend within gap 260, between forward portion 160 and rearward portion 112. In some embodiments, a matrix structure can comprise a single extended portion. In other embodiments, a matrix structure can comprise two or more extended portions. In this exemplary embodiment, matrix structure 299 includes first extended portion 311 and second extended portion 312.

In this embodiment, first extended portion 311 is disposed on forward portion 160. First extended portion 311 may extend in a generally longitudinal direction from forward portion 160 toward rearward portion 112. Likewise, second extended portion 312 is disposed on rearward portion 112. Second extended portion 312 also may extend in a generally longitudinal direction from rearward portion 112 toward forward portion 160. In some cases, first extended portion 311 may include first free end portion 371 that is disposed in gap 260. Likewise, second extended portion 312 may include second free end portion 372 that is disposed in gap 260. First extended portion 311 and second extended portion 312 may form a labyrinth to substantially reduce airflow through bottom portion 261 of gap 260. With this arrangement, first extended portion 311 and second extended portion 312 can substantially reduce hot air from radiator 210 from entering intake cover 100.

Referring to FIG. 3, first extended portion 311 and second extended portion 312 can be associated with any size. In this embodiment, first extended portion 311 extends length L1 from forward portion 160. In a similar manner, second extended portion 312 extends length L2 from rearward portion 112. In some embodiments, length L1 and length L2 may be different lengths. In some cases, length L1 of first extended portion 311 may be larger than length L2 of second extended portion 312. In other cases, length L2 of second extended portion 312 may be larger than length L1 of first extended portion 311. In this exemplary embodiment, length L1 and length L2 are substantially similar. With this arrangement, first extended portion 311 and second extended portion 312 extend toward each other to create a matrix structure to substantially reduce hot air flow from entering intake cover 100.

In addition to extending in a generally longitudinal direction, first extended portion 311 and second extended portion 312 also extend in a generally lateral direction. In particular, first extended portion 311 is configured with width W1. Similarly, second extended portion 312 is configured with width W2. Generally, the values of W1 and W2 may vary. Width W1 and width W2 may comprise various widths. In this exemplary embodiment, width W1 and width W2 are substantially similar. Furthermore, width W1 and width W2 are generally greater than length L1 and length L2. However, in other embodiments, length L1 and length L2 may be greater than width W1 and width W2.

Generally, first extended portion 311 and second extended portion 312 may be configured with any shape to form a matrix structure that prevents hot air flow into intake cover 100. In some embodiments, first extended portion 311 and second extended portion 312 may have different shapes. In an exemplary embodiment, first extended portion 311 and second extended portion 312 have substantially similar shapes. In some cases, first extended portion 311 and second extended portion 312 have a generally flat shape that protrudes from forward portion 160 and rearward portion 112, respectively. In other cases, first extended portion 311 and second extended portion 312 can have a regular geometric shape such as a disc-like shape that protrudes from forward portion 160 and rearward portion 112, respectively. In still other cases, first extended portion 311 and second extended portion 312 may be configured with tooth like projections that extend from forward portion 160 and rearward portion 112, respectively. In this exemplary embodiment, first extended portion 311 and second extended portion 312 have a generally rectangular shape with a relatively small height. In other words, first extended portion 311 and second extended portion 312 are configured as horizontal walls.

In this exemplary embodiment, first extended portion 311 has height H1. Height H1 is substantially less than length L1 and width W1. Likewise, second extended portion 312 is configured with height H2. Height H2 may be substantially less than length L2 and width W2. In one embodiment, height H1 and height H2 are substantially similar. In other embodiments, however, H1 and H2 could be different.

In the current embodiment, first extended portion 311 and second extended portion 312 extend in a generally perpendicular direction from forward portion 160 and rearward portion 112, respectively. However, in other embodiments, first extended portion 311 and second extended portion 312 may extend in a sloping direction from forward portion 160 and rearward portion 112, respectively. For example, in some cases, first extended portion 311 and second extended portion 312 may extend in a downward sloping direction from forward portion 160 and rearward portion 112, respectively.

Generally, first extended portion 311 and second extended portion 312 can be formed in any manner known in the art. In some embodiments, first extended portion 311 and second extended portion 312 may be formed by different methods. In other embodiments, first extended portion 311 and second extended portion 312 may be formed by substantially similar methods. In some cases, first extended portion 311 and second extended portion 312 may be integrally formed with forward portion 160 and rearward portion 112, respectively. In other cases, first extended portion 311 and second extended portion 312 may be fixedly attached to forward portion 160 and rearward portion 112 by any method known in the art, including but not limited to welding, adhesives, and soldering.

In an exemplary embodiment, first extended portion 311 and second extended portion 312 are configured to overlap in a longitudinal direction. Generally, first extended portion 311 and second extended portion 312 may be configured so that any portion of length L1 of first extended portion 311 and length L2 of second extended portion 312 overlap in a longitudinal direction. Furthermore, in this embodiment, second extended portion 312 is disposed above first extended portion 311. However, it is possible in other embodiments that first extended portion 311 can be disposed above second extended portion 312. With this overlapping configuration, first extended portion 311 and second extended portion 312 may create a tortuous air flow path that helps prevent hot air from entering intake cover 100.

First extended portion 311 and second extended portion 312 may be separated by any distance in a generally vertical direction. The term "vertical direction" as used throughout this detailed description and in the claims refers to a direction generally perpendicular to both the longitudinal and lateral directions. In this exemplary embodiment, first extended portion 311 and second extended portion 312 are separated by a vertical distance, as illustrated in FIG. 2. With this arrangement, first extended portion 311 and second extended portion 312 form a matrix structure at bottom portion 261 that substantially reduces hot air flow into intake cover 100 while retaining the capability to drain water from intake cover 100. In particular, water draining from gap 260 may pass around first extended portion 311 and second extended portion 312.

Rearward portion 112 can include additional provisions to help prevent hot air from entering an intake cover through one or more openings. For example, in some embodiments, rearward portion 112 may include vertical extended portion 353. In some embodiments, vertical extended portion 353 may be a lateral side wall of rearward portion 112. In some cases, a portion of vertical extended portion 353 may be disposed adjacent to second opening 302. Furthermore, in some cases, a portion of vertical extended portion 353 may be disposed adjacent to first opening 301. This arrangement may help prevent laterally directed hot air from entering first opening 301 and second opening 302.

In some embodiments, second extended portion 312 may have a shape that follows the contours of rearward portion 112. In the exemplary embodiment, second extended portion 312 may include first curved end 355 disposed adjacent to vertical extended portion 353. This arrangement can facilitate increased structural integrity for second extended portion 312. In an alternative embodiment, however, second extended portion 312 may be spaced apart from vertical extended portion 353.

In some embodiments, rearward portion 112 can also include flange portion 351 disposed below third opening 303. In some cases, flange portion 351 can help direct water escaping from third opening 303. In other cases, flange portion 351 can help prevent upwardly traveling hot air from entering opening 303. In still other cases, flange portion 351 can provide increased structural stability for vertical extended portion 353.

It should be understood that in other embodiments a rearward portion of an intake cover may not be disposed adjacent to a battery cover. Instead, the rearward portion could be disposed adjacent to another portion of a motor vehicle. Generally, the rearward portion could be disposed adjacent to any engine bay component. The term "engine bay component" as used throughout this detailed description and in the claims refers to any device, system, or other type of structure that may be disposed in the engine bay of the motor vehicle. Furthermore, in embodiments where the rearward portion is spaced apart from a forward portion of an engine bay component, the rearward and forward portions can include provisions for blocking hot air. In particular, the forward and rearward portions can include one or more extending portions that form a matrix structure in a similar manner to the previous embodiments.

Figure 4:
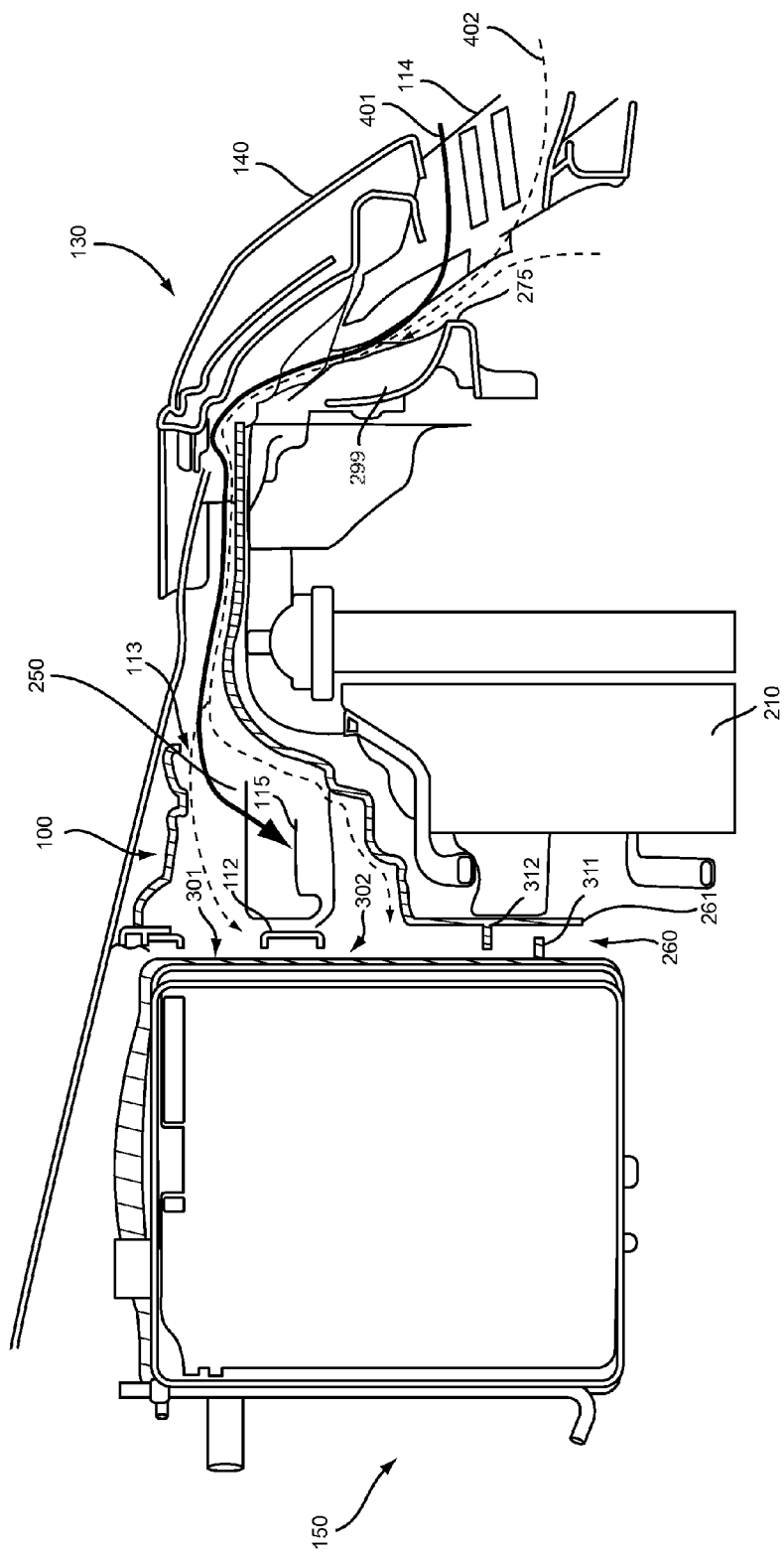
FIG. 4 is a side cross sectional view of an exemplary embodiment of airflow through an intake cover.

FIG. 4 is a side cross sectional view of an exemplary embodiment of air and water flowing through intake cover 100 and gap 260. This embodiment is intended to be exemplary. In other embodiments, air and water can take different paths through intake cover 100.

In this embodiment, air 401 flowing through grill 114 is directed by air guide mount 275 into opening 113 of intake cover 100. With this arrangement, air 401 is constantly being pushed through interior portion 250. Therefore, air 401 disposed with interior portion 250 is constantly being circulated.

As previously discussed, water may also enter intake cover 100. For example, in the current embodiment, water 402 may enter intake cover 100 through grill 114. Likewise, in other embodiments, water 402 may enter intake cover 100 from water that has not been properly deflected by air guide mount 275.

Interior portion 250 of intake cover 100 may be configured to direct air 401 to exit port 115. Furthermore, first opening 301 and third opening 303 (see FIG. 3) may be located within interior portion 250 in a manner that allows water 402 to exit intake cover 100. In some cases, water 402 may exit through first opening 301 and third opening 303. In addition, interior portion 250 is also configured to direct water 402 to second opening 302. In some cases, exit port 115 can be disposed higher than second opening 302. With this arrangement, collecting water can be drained out of second opening 302. As water 402 flows from first opening 301, second opening 302 and third opening 303 (see FIG. 3), water 402 can fall into gap 260 and drain through the matrix structure created by first extended portion 311 and second extended portion 312. With this arrangement, intake cover 100 can provide substantially dry air to an intake system of an engine.

In some previous designs, hot air from an adjacent radiator may enter a bottom portion of a gap disposed between a battery cover and an intake cover. Once the hot air is inside the gap, the hot air can enter the intake cover via one or more openings of the intake cover. This hot air can then enter the intake system through an exit port in the intake cover. In some cases, this hot air entering the intake system can lead to overheating in an engine.

Figure 5:
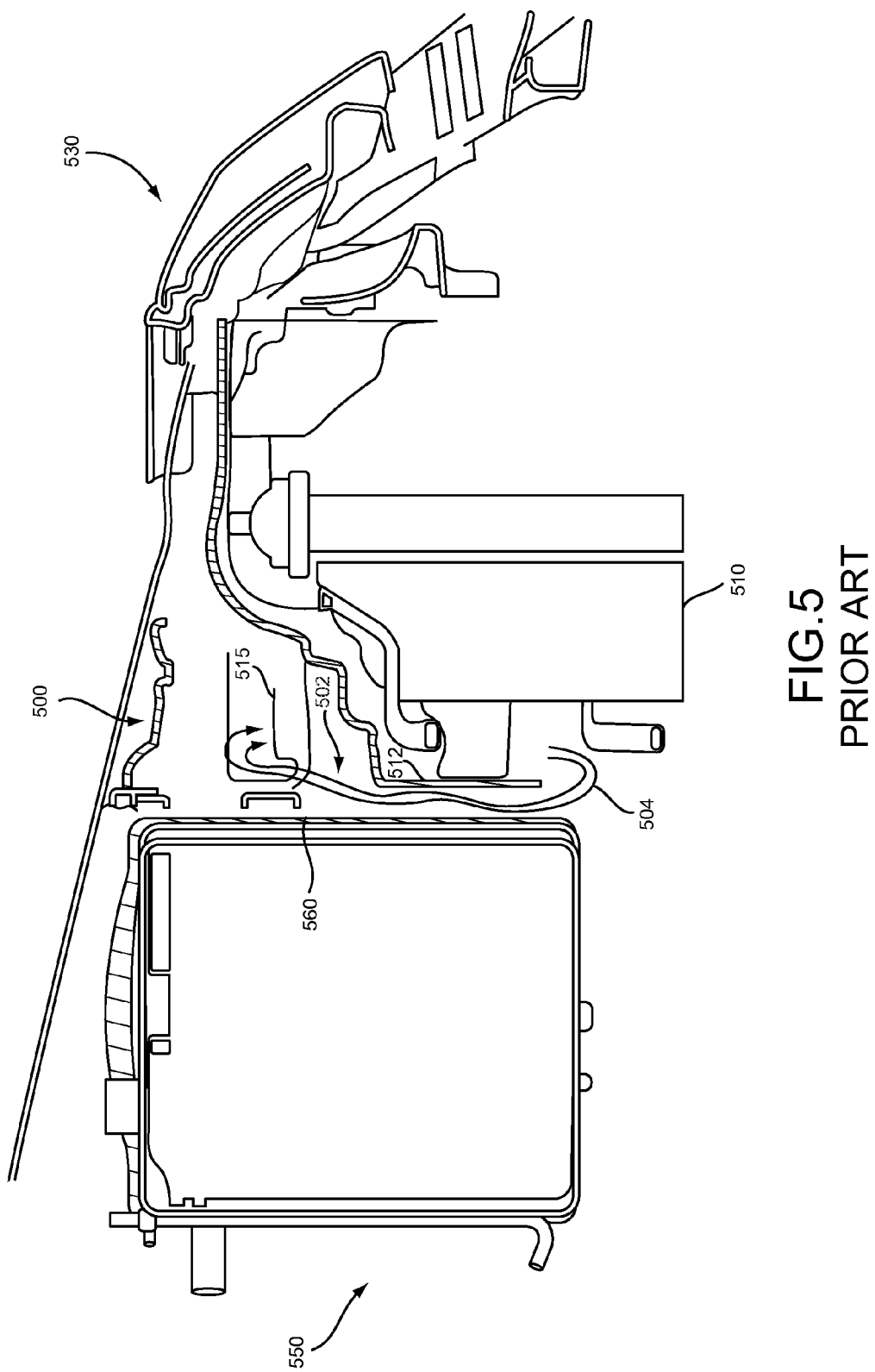
FIG. 5 is a side cross sectional view of a previous design for an intake cover.

FIG. 5 illustrates a previous design for an intake cover. In this case, hot air 504 from radiator 510 may travel between forward portion 560 of battery cover 550 and rearward portion 512 of intake cover 500. Since this design does not include any provisions to reduce flow of hot air, hot air 504 may proceed to opening 502 of rearward portion 512. Finally, in some cases, hot air 504 may travel through exit port 515 of intake cover 500 to enter the intake system.

Figure 6:
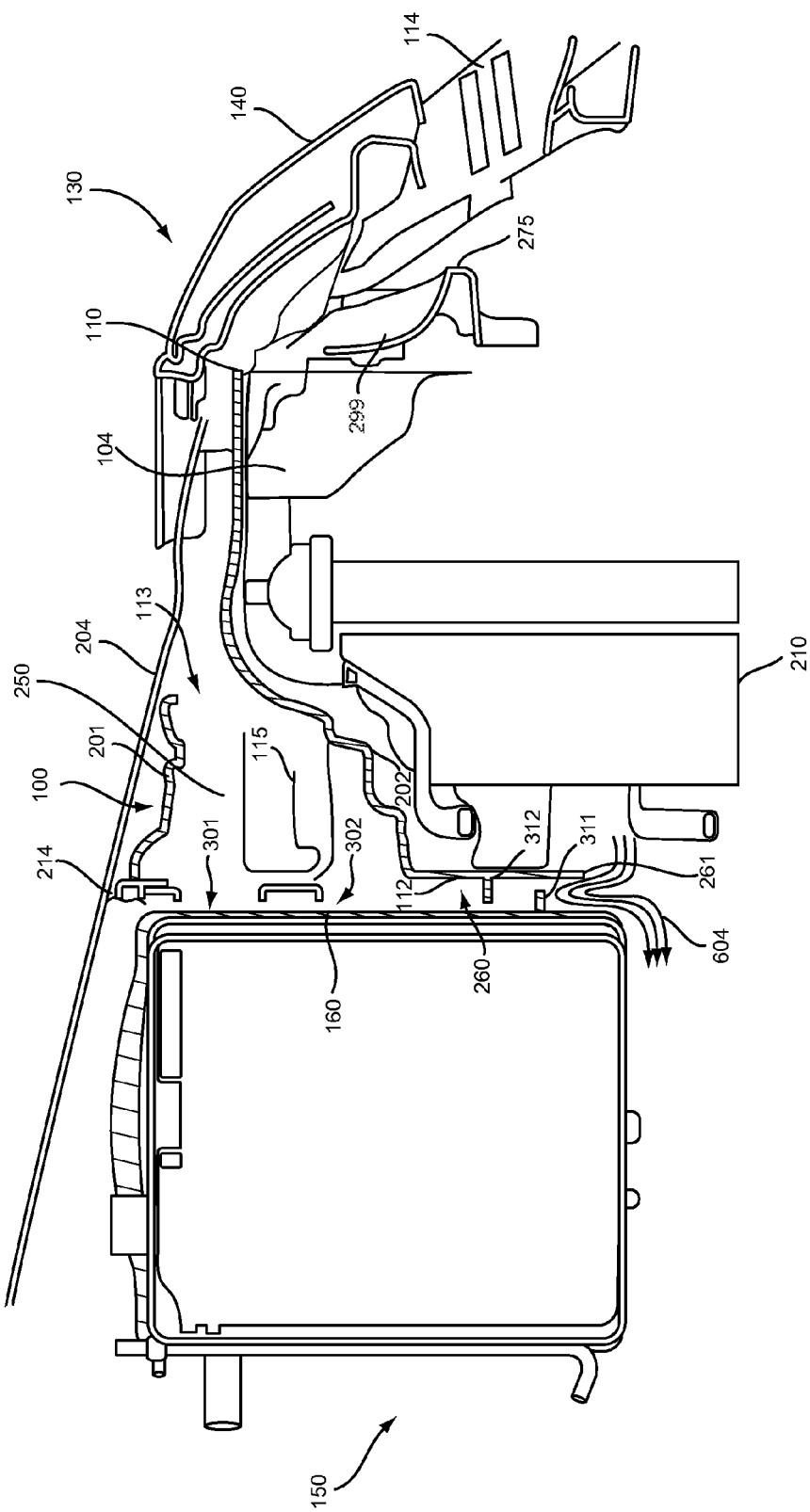
FIG. 6 is a side cross sectional view of an exemplary embodiment of an intake cover configured to divert hot air from a radiator.
Figure 7:
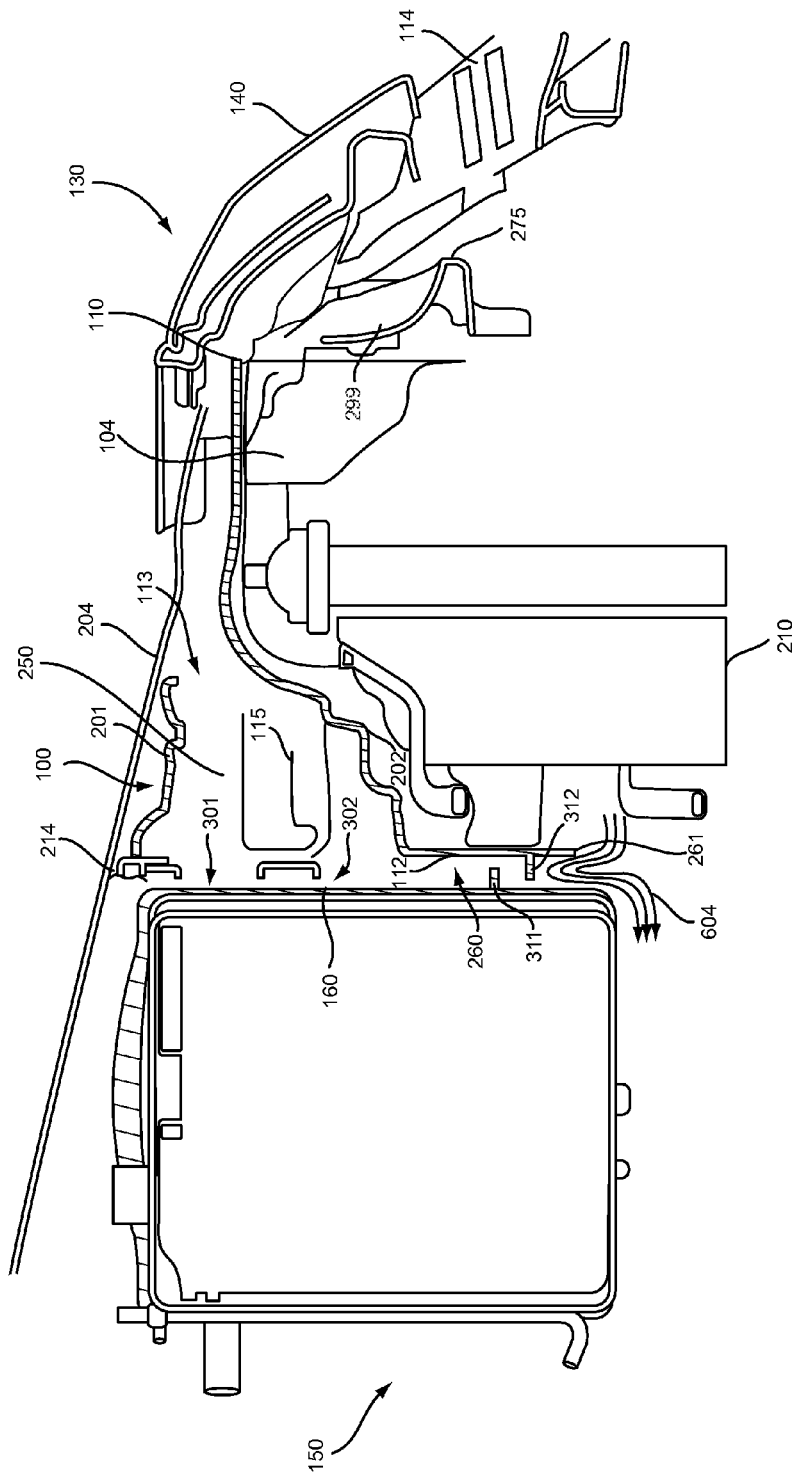
FIG. 7 is a cross sectional view of another embodiment of an intake cover configured to divert hot air from a radiator.

FIG. 6 illustrates an exemplary embodiment of the flow of hot air 604 from radiator 210. The matrix structure may be created by first extended portion 311 and second extended portion 312 creates a torturous air flow path for hot air 604. In other words, this arrangement may lead to reduced airflow around first extended portion 311 and second extended portion 312. In some embodiments, hot air 604 may be substantially diverted from bottom portion 261 of gap 260. With this configuration, first extended portion 311 and second extended portion 312 can substantially reduce hot air 604 from entering gap 260 and possibly entering intake cover 100 through first opening 301, second opening 302 and/or third opening 303 (see FIG. 3). Using this arrangement, hot air 604 may be substantially prevented from entering the intake system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A motor vehicle, comprising:
    an intake cover configured to deliver air to an intake system;
    an engine bay component including a forward portion disposed adjacent to a rearward portion of the intake cover;
    the forward portion being spaced apart from the rearward portion in a generally longitudinal direction, wherein the longitudinal direction generally extends in a direction between a front of the motor vehicle and a rear of the motor vehicle;
    the forward portion including a first extended portion that extends in the longitudinal direction towards the rearward portion,
    the intake cover including a second extended portion that extends in the longitudinal direction towards the forward portion; and
    wherein the first extended portion overlaps with the second extended portion in the longitudinal direction and thereby substantially reduces hot air flow between the forward portion and the rearward portion.

2. The motor vehicle according to claim 1, wherein the forward portion and the rearward portion are spaced apart by a gap.

3. The motor vehicle according to claim 2, wherein the intake cover includes an interior portion.

4. The motor vehicle according to claim 3, wherein the rearward portion of the intake cover includes a first opening that is configured to allow water to flow from the interior portion to the gap.

5. The motor vehicle according to claim 4, wherein the rearward portion of the intake cover includes a second opening that is configured to allow water to flow from the interior portion to the gap.

6. The motor vehicle according to claim 5, wherein the first opening is disposed above the second opening.

7. The motor vehicle according to claim 5, wherein water can pass over the first extended portion and the second extended portion and thereby drain from the gap.

8. The motor vehicle according to claim 1, wherein the first extended portion is disposed above the second extended portion.

9. The motor vehicle according to claim 1, wherein the second extended portion is disposed above the first extended portion.

10. A motor vehicle, comprising:
an intake cover configured to deliver air to an intake system;
an engine bay component including a forward portion disposed adjacent to a rearward portion of the intake cover;
the forward portion and the rearward portion being separated by a gap;
a bottom portion of the gap disposed adjacent to a radiator; and
wherein a matrix structure is disposed in the bottom portion and thereby substantially prevents hot air from the radiator from flowing through the bottom portion.

11. The motor vehicle according to claim 10, wherein the matrix structure includes at least one extended portion.

12. The motor vehicle according to claim 11, wherein the matrix structure includes two or more extended portions.

13. The motor vehicle according to claim 10, wherein the matrix structure includes a first extended portion and a second extended portion.

14. The motor vehicle according to claim 13, wherein the first extended portion extends from a rearward portion of the intake cover.

15. The motor vehicle according to claim 14, wherein the second extended portion extends from a forward portion of the engine bay component.

16. The motor vehicle according to claim 15, wherein the first extended portion extends in a generally perpendicular manner from the rearward portion.

17. The motor vehicle according to claim 16, wherein the second extended portion extends in a generally perpendicular manner from the forward portion.

18. The motor vehicle according to claim 15, wherein the first extended portion and the second extended portion are configured to overlap in a direction extending between the forward portion and the rearward portion.

19. The motor vehicle according to claim 18, wherein the first extended portion is spaced apart from the second extended portion in a generally vertical direction that is perpendicular to the longitudinal direction.

20. The motor vehicle according to claim 10, wherein water can drain through the matrix structure.

21. A system for preventing hot air from entering an intake system in a motor vehicle, the system comprising:
an intake cover configured to deliver air to the intake system;
an engine bay component disposed proximate to the intake cover, wherein a gap is disposed between the engine bay component and the intake cover; and
wherein at least one extended portion extends from one of the intake cover and the engine bay component, the at least one extended portion including a free end portion that is disposed in the gap.

22. The system according to claim 21, wherein the engine bay component is a battery cover.

23. The system according to claim 21, wherein the at least one extended portion includes a first extended portion that extends from the intake cover.

24. The system according to claim 23, wherein the at least one extended portion includes a second extended portion that extends from the engine bay component.

* * * * *